United States Patent
Hong

[19]

[11] Patent Number: 5,873,539
[45] Date of Patent: *Feb. 23, 1999

[54] REEL TABLE TRANSFERRING MECHANISM OF MAGNETIC RECORDING/REPRODUCING APPARATUS

[75] Inventor: Min-pyo Hong, Seoul, Rep. of Korea

[73] Assignee: Samsung Electronics Co., Ltd., Kyungki-do, Rep. of Korea

[*] Notice: The term of this patent shall not extend beyond the expiration date of Pat. No. 5,669,569.

[21] Appl. No.: 650,901

[22] Filed: May 17, 1996

[30] Foreign Application Priority Data

May 18, 1995 [KR] Rep. of Korea ................. 1995 12459

[51] Int. Cl.[6] .................................................. G11B 15/00
[52] U.S. Cl. ........................................ 242/352.1; 242/336
[58] Field of Search .................................. 242/336, 342, 242/352, 352.1; 360/94

[56] References Cited

U.S. PATENT DOCUMENTS

| | | | |
|---|---|---|---|
| 4,873,593 | 10/1989 | Baranski | 360/94 |
| 4,903,149 | 2/1990 | Hasegawa et al. | 360/69 |
| 5,082,195 | 1/1992 | Saito et al. | 242/336 |
| 5,316,236 | 5/1994 | Hasegawa et al. | 360/94 |
| 5,583,718 | 12/1996 | Kobayashi | 360/94 |

FOREIGN PATENT DOCUMENTS

| | | |
|---|---|---|
| 0 463 786 | 1/1992 | European Pat. Off. . |
| 32 34 854 | 5/1983 | Germany . |

*Primary Examiner*—John P. Darling
*Attorney, Agent, or Firm*—Sughrue, Mion, Zinn, Mapeak & Seas, PLLC

[57] ABSTRACT

A reel table transferring mechanism for selectively loading tape cassettes of a different size includes rotating arms on which the reel tables are supported and a rotator for rotating the rotating arms. Thus, the position of and distance between the reel tables are determined by the rotation angle of the rotating arms.

8 Claims, 6 Drawing Sheets

REEL TABLE TRANSFERRING MECHANISM OF MAGNETIC RECORDING/ REPRODUCING APPARATUS

BACKGROUND OF THE INVENTION

1. Field of the Invention

The present invention relates to a reel table transferring mechanism for magnetic recording/reproducing apparatus such as VTR'S, camcorders or digital-video cassette recorders (D-VCR's), and more particularly, to a reel table transferring mechanism of a magnetic recording/reproducing apparatus, in which a cassette having one of at least two different sizes is selectively loaded.

2. Description of the Related Art

Generally, a pair of reel tables are provided in a magnetic recording/reproducing apparatus using a magnetic tape, such as a VTR, Camcorder, or D-VCR. A mechanism disclosed in *Japan Television Associates* Vol. 44, No.9, p.1216, includes a pair of reel tables that can move to select one of at least two tape cassettes of different sizes. As illustrated in FIG. 1, reel tables 21 and 22 are supported to slide along respective pairs of guide shafts 23, 23' and 24, 24', respectively. Timing belts 25 and 26 driven by a motor 27 enable the reel tables 21 and 22 to move, thus varying the distance therebetween to enable loading of tape cassettes of different sizes.

In the above-described mechanism in which the reel tables 21 and 22 move linearly, installing the required guide rail pairs 23, 23' and 24, 24' requires a large amount of space on the deck and renders the apparatus complicated. Also, since each reel table is coupled by just one stopper guide at each side thereof, the reel tables 21 and 22 are unstable. Hence, the reel tables 21 and 22 may vibrate and generate noise and the mechanism may not operate smoothly.

SUMMARY OF THE INVENTION

To solve the above problems, it is an object of the present invention to provide a reel table transferring mechanism of a magnetic recording/reproducing apparatus by which a smoother and more stable transfer of the reel table can be achieved.

To achieve the above object, a reel table transferring mechanism of a magnetic recording/reproducing apparatus comprises a deck having first and second arc-shaped holes formed therein, first and second fixed shafts separated by a predetermined distance fixed to the deck, a pair of rotating arms rotatably installed on the first and second fixed shafts on which reel tables for receiving a tape cassette are supported, a pair of driving arms, each having geared portions that engage with each other, rotatably coupled to the first and second fixed shafts respectively, a driving motor for driving the driving arms by a gear train coupled to the geared portions of the driving arms, and connecting means for coupling the driving arms with the rotating arms so that a driving force of the driving motor is transferred to each of the rotating arms.

It is preferable that one motor for driving each of the reel tables is installed on each rotating arm, respectively. Also, the connecting means consists of cavities formed at the bottoms of the driving arms respectively, indented portions formed on the rotating arms corresponding to the cavities, respectively, and a coil spring inserted respectively in a space defined by the cavities and the indented portions.

Also, a preventing means for preventing excessive rotation of the rotating arms, comprises protrusions formed on the rotating arms and stoppers formed on the deck for restricting the rotation of the rotating arms by interacting with the protrusions.

In a reel table transferring mechanism of a magnetic recording/reproducing apparatus according to another embodiment of the present invention, a pair of reel tables are installed on a deck and reels of a tape cassette are placed on the reel tables, and adjusting means for adjusting the interval between the reel tables so that tape cassettes of different sizes can be selectively placed on said reel tables comprises, first and second fixed shafts fixed to the deck and being separated by a predetermined interval, a pair of rotating arms, on which the reel tables are supported, rotatably installed on the first and second fixed shafts, and rotating means for rotating the rotating arms, whereby the distance between the reel tables is adjusted by the rotation of the rotating arms.

The rotating mean includes a geared portion formed at an end of each of the rotating arms, the geared portions being engaged with each other. One geared portion of the rotating arms is coupled to a driving motor via a gear train and first and second arc-shaped holes corresponding to the rotation of the reel tables are formed on the deck. Motors for driving the reel tables are installed under the rotating arms, respectively.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
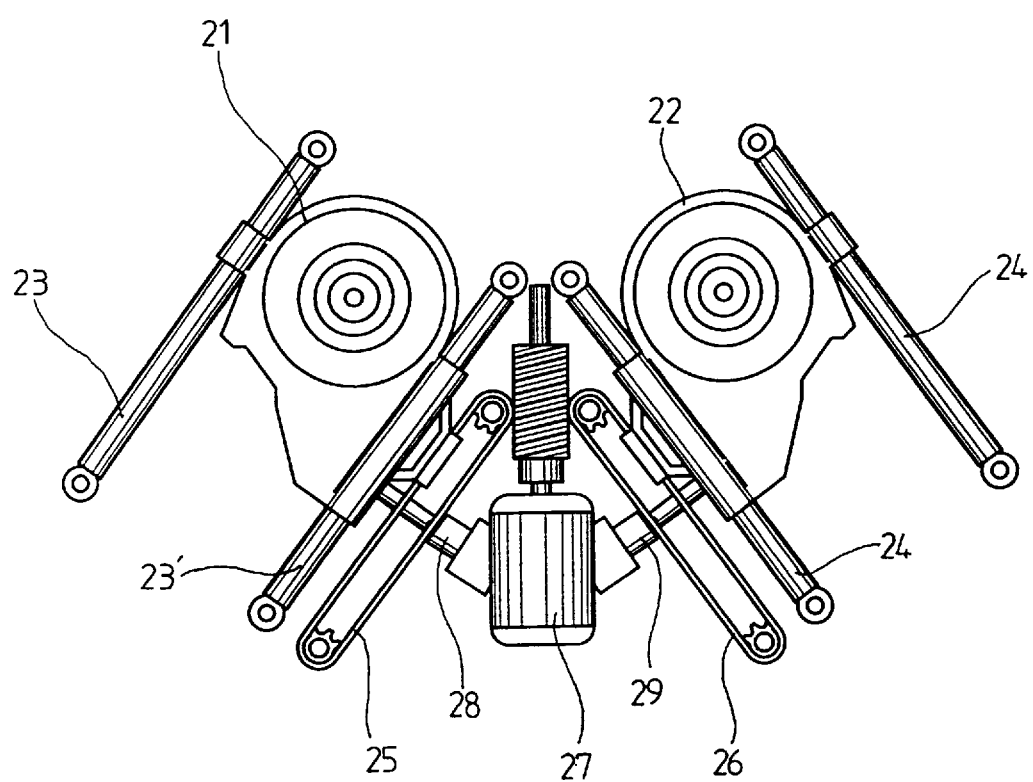
FIG. 1 is a plan view schematically illustrating a conventional reel table transferring mechanism.
Figure 2:
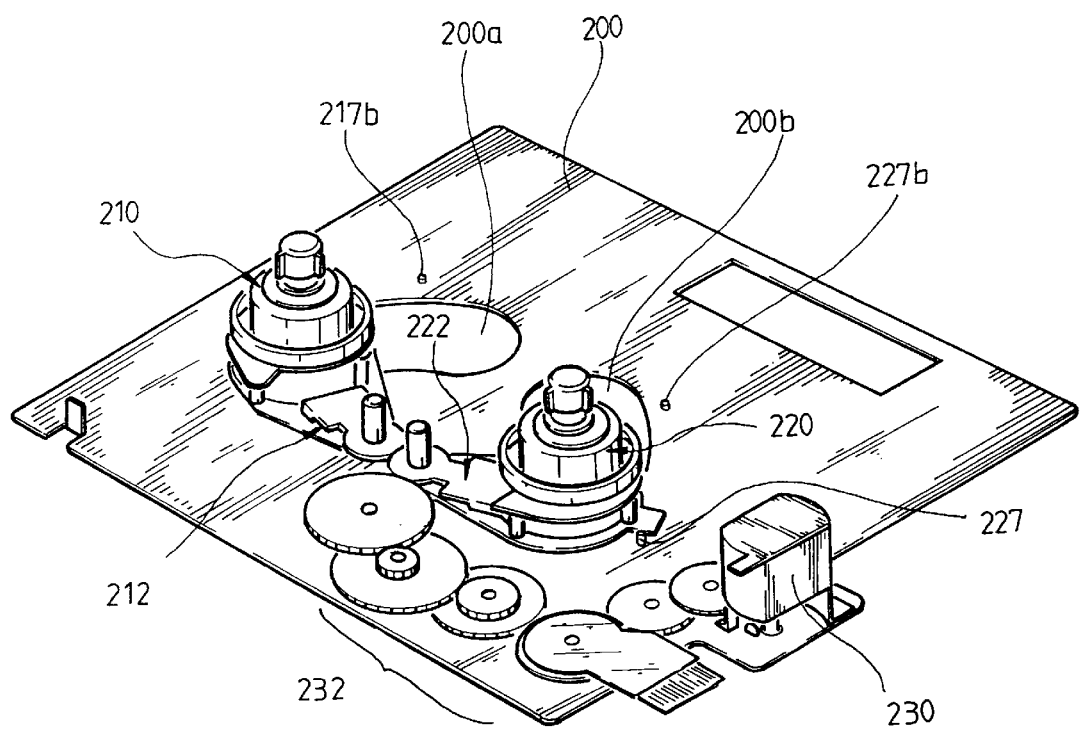
FIG. 2 is a perspective view illustrating a reel table transferring mechanism according to a first embodiment of the present invention.
Figure 3:
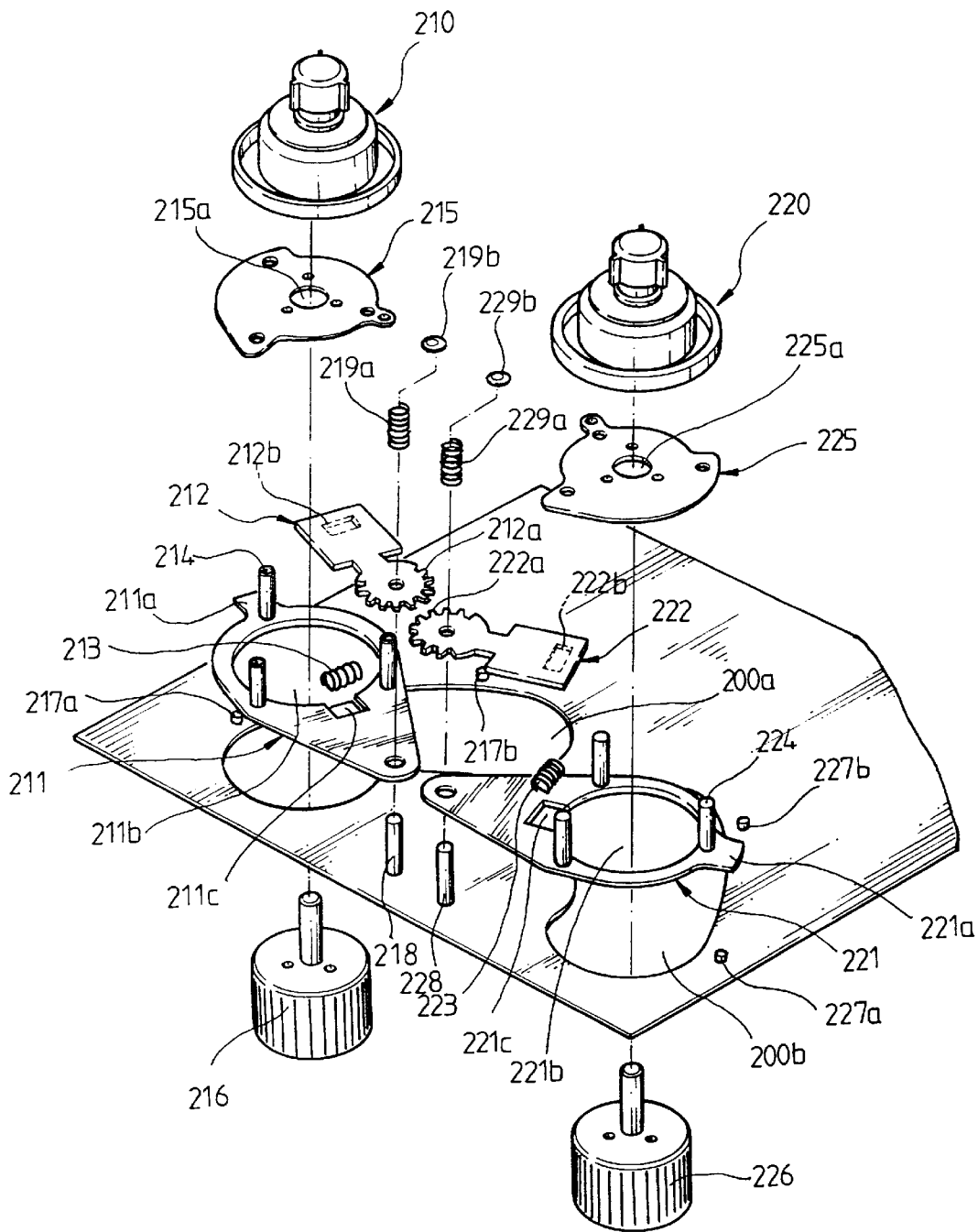
FIG. 3 is an exploded perspective view showing the essential parts of the mechanism of FIG. 2.

FIGS. 2 and 3 illustrate the reel table transferring mechanism of a magnetic recording/reproducing apparatus according to the first preferred embodiment of the present invention. First and second arc-shaped holes 200a and 200b are symmetrically formed on a deck 200. First and second fixed shafts 218 and 228 are disposed on the deck 200 are separated by a predetermined interval and are disposed between the first and second holes 200a and 200b. Rotating arms 211 and 221 are rotatably coupled to the first and second fixed shafts 218 and 228, respectively. Driving arms 212 and 222, each having a geared portion 212a and 222a respectively on one end thereof, are rotatably coupled to the first and second fixed shafts 218 and 228, respectively. Geared portions 212a and 222a are engaged with each other. The driving arms 212 and 222 are elastically biased toward the rotating arms 211 and 221 by springs 219a and 229a and washers 219b and 229b, respectively.

A driving motor 230 for generating a driving force is installed at one side of the deck 200. The driving force of motor 230 is transmitted to the geared portion 222a via a gear train 232.

A connecting means for connecting the driving arms 212 and 222 with respective ones of the rotating arms 211 and 221 is provided so that the power of the driving motor 230 can be transmitted to the respective rotating arms 211 and 221. The connecting means includes cavities 212b and 222b formed on the respective lower surfaces of the driving arms 211 and 222, indented portions 211c and 221c formed on the respective rotating arms 211 and 221 in opposition to the cavities 212b and 222b, and coil springs 213 and 223 disposed in a space defined between the cavities 212b and 222b and indented portions 211c and 221c, respectively. That is, the coil springs 213 and 223 are disposed half in the cavities 212b and 222b, respectively, and half in the indented portions 211c and 221c, respectively. Thus, the driving motor 230 transmits power to the rotating arms 211 and 221 via the coil springs 213 and 223 due to interaction between edges of the cavities and the indented portion, and the associated springs.

The reel tables 210 and 220 and the motors 216 and 226 for rotating the reel tables 210 and 220 are installed on the rotating arms 211 and 221, respectively. In more detail, the coupling holes 211b and 221b in which the motors 216 and 226 are mounted are formed on each rotating arm 211 and 221. The plates 215 and 225 having holes 215a and 225a are supported above the coupling holes 211b and 221b by a plurality of supports 214 and 224. The rotors of motors 216 and 226 are connected to the reel tables 210 and 220 through the holes 215a and 225a of the plates 215 and 225.

Meanwhile, a preventing means for preventing excess rotation of the rotating arms 211 and 221 is constituted by protrusions 211a and 221a formed at the outer ends of the rotating arms 211 and 221, and stoppers 217a, 217b, 227a and 227b formed on the deck 200 for limiting the rotation of the arms 211 and 221 to a predetermined angular interval. The stoppers 217a, 217b, 227a and 227b can be formed at predetermined positions along the rotating path of the protrusions 211a and 221a.

Figure 5:
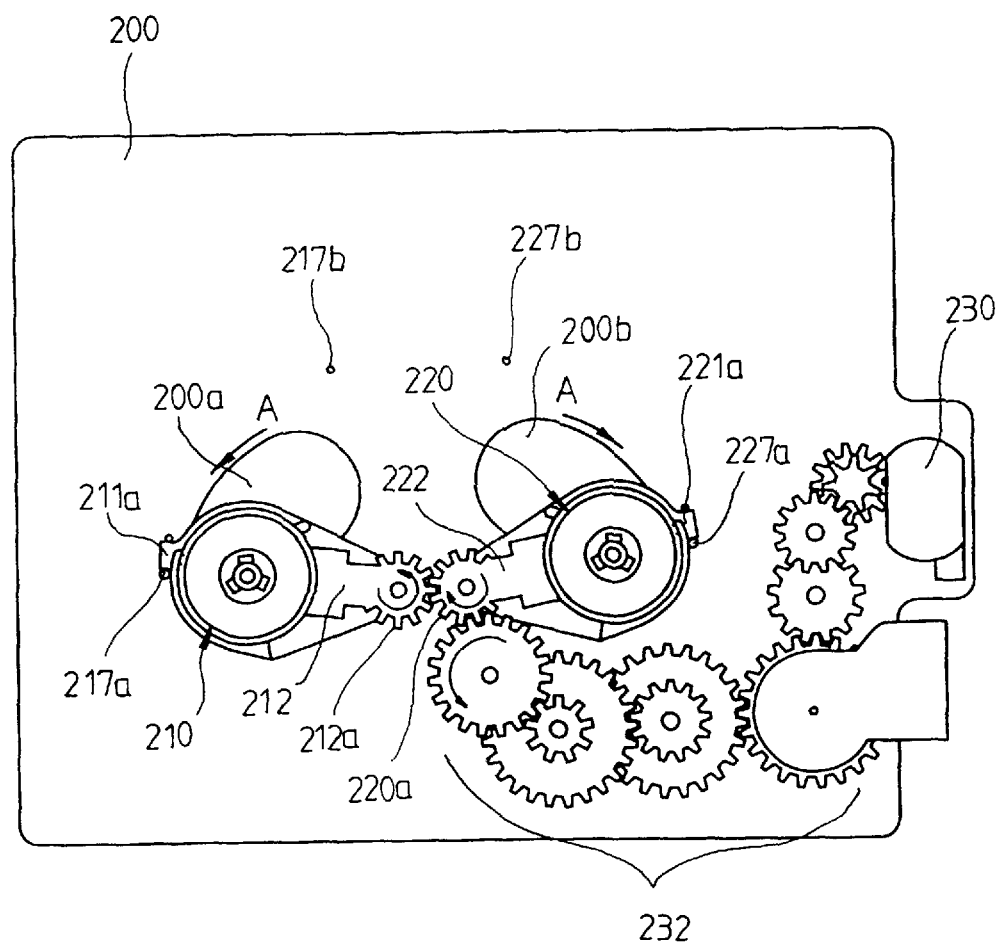
FIGS. 5 and 6 are plan views respectively illustrating the transferred positions of the reel tables according to the first embodiment of the present invention.

The operation of the reel table transferring mechanism according to the first preferred embodiment of the present invention will be described below. Referring to FIGS. 2, 3 and 5, when a large tape cassette is loaded, the distance between the reel tables 210 and 220 is adjusted as follows. First, the driving motor 230 is driven so that the last gear of the gear train 232 engaged with the gear portion 222a of the driving arm 222 rotates counterclockwise and thus the two engaged rotating arms 211 and 221 rotate along the direction of arrow A in FIG. 5. Eventually, the protrusions 211a and 221a of the rotating arms 211 and 221 contact the stoppers 217a and 227a. Driving arms 212 and 222 are rotated slightly further as driving arms 212 and 222 press against the coil springs 213 and 223 by the power of the driving motor 230. The rotating arms 211 and 221 thus are pressed tightly against the stoppers 217a and 227a due to the restoring forces of the springs 213 and 223. Thus, the reel tables 210 and 220 are stably disposed at their final positions.

Figure 6:
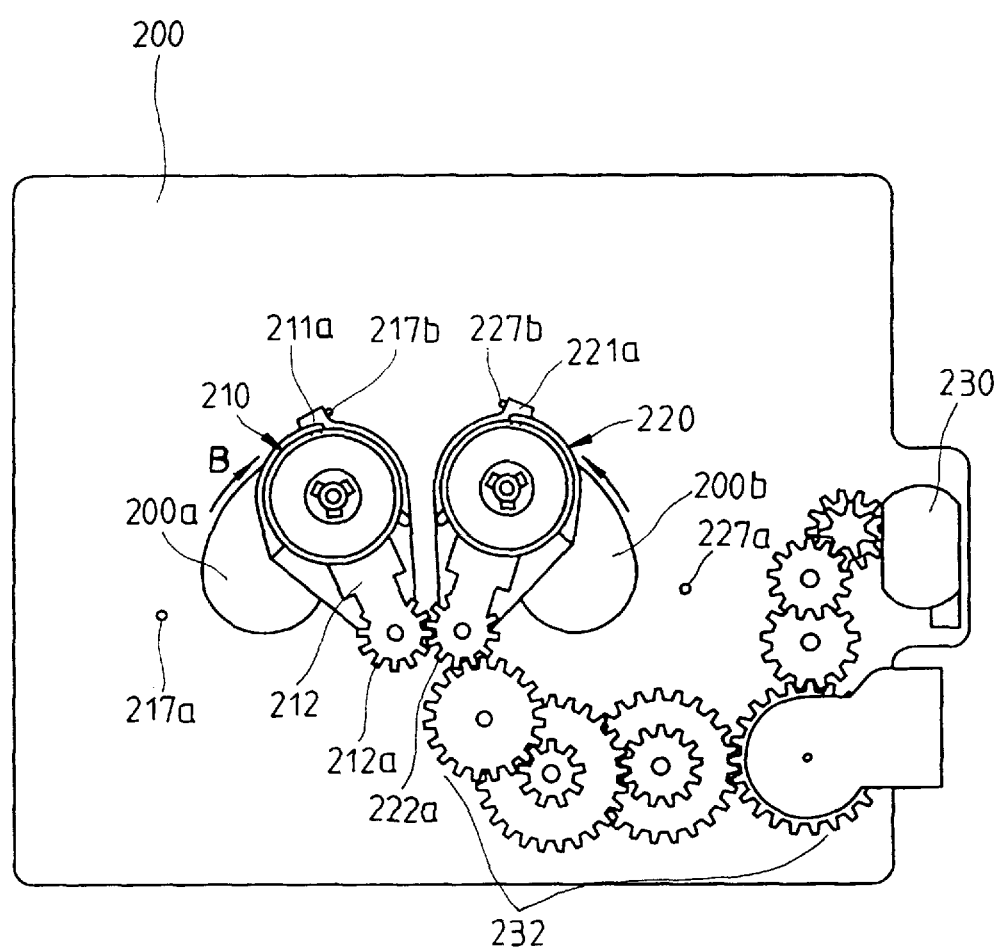

When a small tape cassette is loaded, referring to FIGS. 2, 3 and 6, the distance between the reel tables 210 and 220 is controlled as follows. The driving motor 230 is driven so that the final gear of the gear train 232 which is engaged with the gear portions 222a of the driving arm 222 rotates clockwise, the two engaged rotating arms 211 and 221 rotate in the direction of arrow B. Eventually, the protrusions 211a and 221a of the rotating arms 211 and 221 make contact with the stoppers 217b and 227b. The driving arms 212 and 222 are further rotated by the power of the driving motor 230 while compressing the coil springs 213 and 223. The rotating arms 211 and 221 thus are pressed tightly against the respective stoppers 217b and 227b due to the restoring force of springs 213 and 223. Thus, the reel tables 210 and 220 are stably at rest at their final positions. Accordingly, the reel tables can be set at various positions corresponding to various sized tape cassettes.

Figure 4:
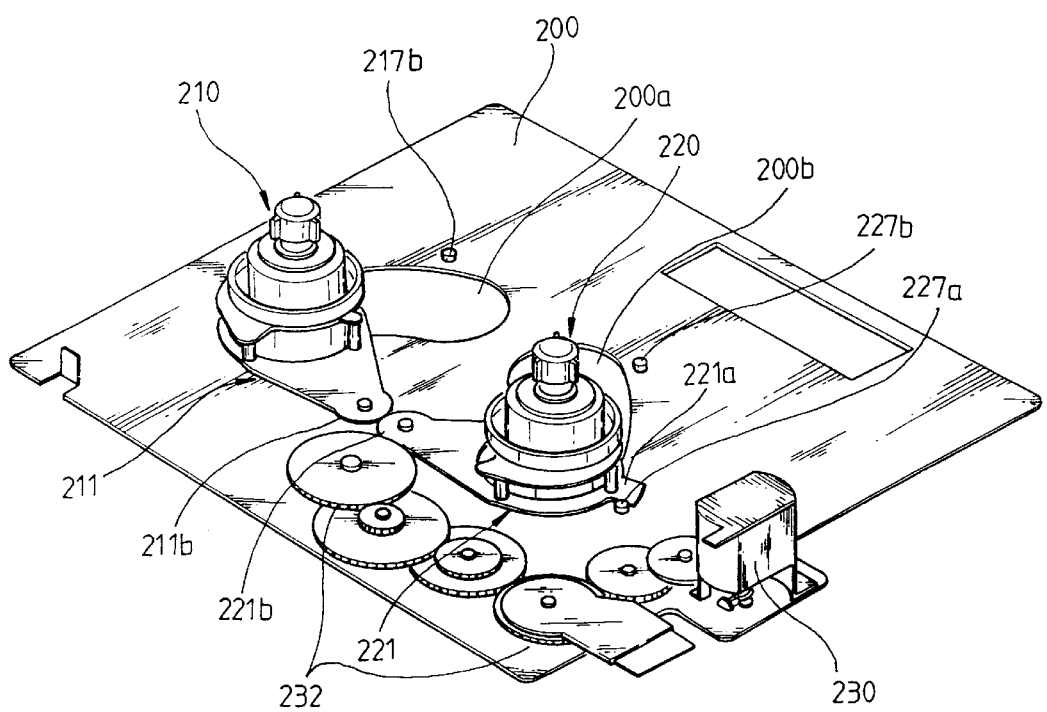
FIG. 4 is a perspective view illustrating a reel table transferring mechanism according to a second embodiment of the present invention.

FIG. 4 illustrates another embodiment of the present invention in which the geared portions 211d and 221d are directly formed on the rotating arms 211 and 221. The rotation directions of the rotating arms 211 and 221 are determined according to the rotation direction of the driving motor 230 as above. Hence, the interval between the reel tables 210 and 220 can be adjusted by activation at the driving motor 230. Also, the rotation angle of the rotating arms 211 and 221 can be restricted by the stoppers 217a, 217b, 227a and 227b.

In a mechanism according to the embodiment shown in FIG. 4, a means for adjusting the interval of the two reel tables 210 and 220 has the following structure. The elements of FIG. 4 that are the same as those described in FIGS. 2 and 3 are indicated by the same reference numerals.

The arc-shaped holes 200a and 200b are symmetrically formed on the deck 200. The first and second fixed shafts 218 and 228 are fixedly installed between the two holes 200a and 200b separated by a predetermined distance. The rotating arms 211 and 221 are rotatably installed at the first and second fixed shafts 218 and 228, respectively. The rotating arms 211 and 221 are rotated by a rotating means. The motors 216 and 226 are each installed under the rotating arms 211 and 221, and the reel tables 210 and 220 are fixed to the shafts of the motors 216 and 226, respectively.

The above-mentioned rotating means is structured as follows. Geared portions 211d and 221d are formed at the ends of rotating arm 211 and 221 respectively, the geared portions 211d and 221d being engaged with each other. The driving motor 230 for generating a driving force is installed at one side of the deck 200 The driving motor 230 and the geared portion 221d are connected via the gear train 232. Thus, the rotating arms 211 and 221 are rotated simultaneously by the driving force of the driving motor 230.

As described above, a means for preventing excessive rotation of the rotating arms 211 and 221 is further provided. The preventing means comprises protrusions 211a and 221a formed at the radial ends of the rotating arms 211 and 221, respectively, and stoppers 217a, 217b, 227a and 227b for limiting the rotation of the arms 211 and 221 formed on the deck 200. Accordingly, the rotation of the rotating arms 211 and 221 is restricted by the stoppers.

The advantages of the reel table transferring mechanism of the magnetic recording/reproducing apparatus according to the present invention are as follows. First, since the interval between the reel tables 210 and 220 is adjusted by the rotating rotating arms 211 and 221, the operation thereof is smooth and the structure thereof is simplified. Second, since the reel tables 210 and 220 are firmly pressed by the spring force, rotation of cassette reels becomes smooth and less noise is generated than the conventional mechanism. Finally, operation of the invention can be controlled by known control processors or the like.

The invention has been described through preferred embodiments. However, modifications can be made without departing from the scope of the invention as defined by the appended claims.

What is claimed is:

1. A reel table transferring mechanism of a magnetic recording/reproducing apparatus comprising:

a deck having first and second arc-shaped holes formed therein;

first and second fixed shafts disposed on said deck and being separated by a predetermined distance;

a rotating arm rotatably installed around each of said first and second fixed shafts, reel tables for receiving a tape cassette being supported on said rotating arms;

a pair of driving arms, each of said driving arms having geared portions that are engaged with each other, said driving arms being rotatably coupled to at least one of said first and second fixed shafts, respectively;

a driving motor for driving said driving arms, said driving motor being coupled by a gear train to said geared portions of said driving arms; and connecting means for coupling said driving arms with said rotating arms so that a driving force of said driving motor is transferred to each of said rotating arms.

2. A reel table transferring mechanism of a magnetic recording/reproducing apparatus as claimed in claim 1, wherein a motor for driving said reel tables is installed at each of said rotating arms, respectively.

3. A reel table transferring mechanism of a magnetic recording/reproducing apparatus as claimed in claim 1, wherein said connecting means comprises:

a cavity formed in a bottom portion of each of said driving arms, respectively;

an indented portion formed on each of said rotating arms corresponding to said cavities, respectively; and a coil spring inserted respectively in a space defined between each of said cavities and an associated one of said indented portions.

4. A reel table transferring mechanism of a magnetic recording/reproducing apparatus as claimed in claim 1, further comprising preventing means for preventing excessive rotation of said rotating arms.

5. A reel table transferring mechanism of a magnetic recording/reproducing apparatus as claimed in claim 4, wherein said preventing means comprises:

protrusions formed on said rotating arms; and stoppers formed on said deck for restricting the rotation of said rotating arms by interacting with said protrusions.

6. A reel table transferring mechanism of a magnetic recording/reproducing apparatus having a pair of reel tables installed on a deck, reels of a tape cassette are placed on said reel tables, and adjusting means for adjusting the interval between said reel tables so that tape cassettes of different sizes can be selectively placed on said reel tables, wherein said adjusting means comprises:

first and second fixed shafts fixed to said deck, said fixed shafts being separated by a predetermined interval;

a pair of rotating arms, on which said reel tables are supported, rotatably installed around said first and second fixed shafts respectively; and a geared portion formed at an end of each of said rotating arms, said geared portions being engaged with each other, and at least one geared portion of said rotating arms is coupled with a driving motor via a gear train, and wherein first and second arc-shaped holes corresponding to the rotation of said reel tables are formed on said deck, and motors for driving said reel tables are installed under said rotating arms, respectively.

7. A reel table transferring mechanism of a magnetic recording/reproducing apparatus as claimed in claim 6, further comprising preventing means for preventing excessive rotation said rotating arms.

8. A reel table transferring mechanism of a magnetic recording/reproducing apparatus as claimed in claim 7, wherein said preventing means comprises:

protrusions formed on said rotating arms, respectively; and stoppers formed on said deck for restricting the rotation of said rotating arms by interacting with said protrusions.

\* \* \* \* \*